(12) United States Patent
Nguyen et al.

(10) Patent No.: US 10,938,440 B2
(45) Date of Patent: Mar. 2, 2021

(54) EFFICIENT METHODS FOR GENERATING CHIRP SPREAD SPECTRUM SIGNALS

(71) Applicant: Cisco Systems Canada Co., Toronto (CA)

(72) Inventors: Tung Trong Nguyen, Saskatoon (CA); Ha Hoang Nguyen, Saskatoon (CA)

(73) Assignee: Cisco Systems Canada Co., Toronto (CA)

( * ) Notice: Subject to any disclaimer, the term of this patent is extended or adjusted under 35 U.S.C. 154(b) by 71 days.

(21) Appl. No.: 16/376,461

(22) Filed: Apr. 5, 2019

(65) Prior Publication Data

US 2019/0356351 A1 Nov. 21, 2019

Related U.S. Application Data

(60) Provisional application No. 62/672,778, filed on May 17, 2018.

(51) Int. Cl.
*H04B 1/69* (2011.01)

(52) U.S. Cl.
CPC ....... *H04B 1/69* (2013.01); *H04B 2001/6912* (2013.01)

(58) Field of Classification Search
CPC .......................... H04B 2001/6912; H04B 1/69
(Continued)

(56) References Cited

U.S. PATENT DOCUMENTS 7,791,415 B2 * 9/2010 Hornbuckle .......... H03L 7/1976
331/1 A
8,406,275 B2   3/2013 Sforza
(Continued)

FOREIGN PATENT DOCUMENTS

CN        103973626 A    8/2014
CN        205029651 U    2/2016
(Continued)

OTHER PUBLICATIONS

LoRa Alliance, Inc., "LoRaWAN™ 1.1 Specification", Oct. 11, 2017, 101 pages.
(Continued)

*Primary Examiner* — Wednel Cadeau
(74) *Attorney, Agent, or Firm* — Edell, Shapiro & Finnan, LLC

(57) ABSTRACT

An apparatus comprises a frequency accumulator to produce a frequency ramp, and a symbol modulator to receive symbols and to add to the frequency ramp frequency offsets representative of the symbols, to produce a modulated frequency ramp for a modulated chirp. The apparatus includes a spreading factor controller to control a roll-over rate of the modulated frequency ramp responsive to spreading factor and frequency bandwidth control signals, to control a spreading factor and a frequency bandwidth of the modulated chirp. The apparatus includes a center frequency controller to control a center frequency of the modulated frequency ramp responsive to a center frequency control signal. The apparatus includes a phase accumulator to accumulate frequency samples of the modulated frequency ramp to produce phase samples corresponding to the modulated chirp, and a vector rotator to rotate the phase samples based on an input vector to produce a modulated chirp.

20 Claims, 14 Drawing Sheets

(58) Field of Classification Search
USPC .......................................................... 375/239
See application file for complete search history.

(56) References Cited

U.S. PATENT DOCUMENTS

| | | | |
|---|---|---|---|
| 9,252,834 B2 | 2/2016 | Seller et al. | |
| 2002/0009125 A1 | 1/2002 | Shi | |
| 2014/0219329 A1 | 8/2014 | Seller et al. | |
| 2016/0277747 A1 | 9/2016 | Schaffner | |
| 2018/0006680 A1 | 1/2018 | Seller et al. | |
| 2020/0052734 A1* | 2/2020 | Talla | H04B 1/69 |

FOREIGN PATENT DOCUMENTS

| | | |
|---|---|---|
| EP | 2763321 A1 | 6/2014 |
| WO | 2018075653 A1 | 4/2018 |

OTHER PUBLICATIONS

SEMTECH Corporation, "AN1200.22 LoRa™ Modulation Basics", Revision 2, May 2015, 26 pages.

SEMTECH Corporation, "AN1200.26 LoRa™ and FCC Part 15.247: Measurement Guidance", Revision 1, May 2015, 22 pages.

Brecht Reynders et al., "Chirp Spread Spectrum as a Modulation Technique for Long Range Communication", 978-1-5090-4361, downloaded Jan. 14, 2019, 5 pages.

Xing Ouyang et al., "Chirp Spread Spectrum Toward the Nyquist Signaling Rate—Orthogonality Condition and Applications", 1070-9908, IEEE Signal Processing Letters, vol. 24, No. 10, Oct. 2017, 5 pages.

Xing Ouyang et al., "Orthogonal Chirp Division Multiplexing", 0090-6778, IEEE Transactions on Communications, vol. 64, No. 9, Sep. 2016, 12 pages.

SEMTECH Corporation, "SX1272/3/6/7/8: LoRa Modem Designer's Guide AN1200.13", Jul. 2013, 9 pages.

Tung T. Nguyen et al., "Digital Interpolating Peak Locator", IEEE 978-1-5090-0873, Jun. 2016, 5 pages.

Jordi Vil'a-Valls et al., "Are PLLs Dead? A Tutorial on Kalman Filter-based Techniques for Digital Carrier Synchronization", Jul. 2017, 31 pages.

SEMTECH Corporation, "Application Note: LoRa® Modulation Crystal Oscillator Guidance", AN1200.14, Rev 2.1, Aug. 2018, 10 pages.

Ara Patapoutian, "On Phase-Locked Loops and Kalman Filters", IEEE Transactions on Communications, vol. 47, No. 5, IEEE 0090-6778, May 1999, 3 pages.

Daniele Croce et al., "Impact of LoRa Imperfect Orthogonality: Analysis of Link-Level Performance", IEEE Communications Letters, vol. 22, No. 4, Apr. 2018, 4 pages.

\* cited by examiner

US 10,938,440 B2

EFFICIENT METHODS FOR GENERATING CHIRP SPREAD SPECTRUM SIGNALS

PRIORITY CLAIM

This application claims priority to U.S. provisional patent application No. 62/672,778, filed May 17, 2018, incorporated by reference herein in its entirety.

TECHNICAL FIELD

The present disclosure relates to generating chirp spread spectrum signals.

BACKGROUND

Low Power Wide Area Network (LPWA) technology, such as Long-Range (LoRa®) technology, enables wide communication coverage by using the technique of chirp spread spectrum (CSS). CSS is very flexible in providing tradeoffs between reception sensitivity and throughput. Spreading factor (SF) is the most important parameter in CSS modulation. Increasing the SF can significantly extend the communication range, but it comes at the cost of a lower transmission rate. Bandwidth is another adjustable parameter. Using larger bandwidth enhances the communication speed and, at the same time, provides better immunity to narrowband. LPWA infrastructures, such as a LoRaWAN™ network, is expected to exploit the modulation flexibility of CSS to optimize the network capacity.

The flexibility of CSS modulation leads to more expensive transceivers, as extra hardware resources are needed to support multiple SFs. Currently, the most cost-effective design employs a look-up table (LUT) to store a base chirp for each SF. As a rule of thumb, the size of a LUT increases exponentially with SF. While this might not pose a serious problem for SF values from 6 to 12 as supported by currently available commercial LoRa transceivers, the LUT design will become exceedingly costly when higher SF values are desired.

DESCRIPTION OF EXAMPLE EMBODIMENTS

Overview

In one embodiment, an apparatus is provided that includes: a frequency accumulator to repetitively accumulate an input word to produce a frequency ramp; a symbol modulator to receive symbols and to add to the frequency ramp frequency offsets representative of the symbols, to produce a modulated frequency ramp for a modulated chirp; a spreading factor controller to control a roll-over rate of the modulated frequency ramp responsive to a spreading factor control signal and a frequency bandwidth control signal, to control a spreading factor and a frequency bandwidth of the modulated chirp; a center frequency controller to control a center frequency of the modulated frequency ramp and, correspondingly, the modulated chirp, responsive to a center frequency control signal; a phase accumulator to accumulate frequency samples of the modulated frequency ramp to produce phase samples corresponding to the modulated chirp; and a vector rotator to rotate the phase samples based on an input vector to produce the modulated chirp with the spreading factor, the frequency bandwidth, and the center frequency.

Example Embodiments

In a digital communication system, data symbol modulation is generally done at baseband in a complex plane consisting of in-phase and quadrature signals. This is most efficient to store samples at the lowest rate. Then, an up-conversion process is applied to both in-phase and quadrature signals individually using pairs of filters and digital-to-analog converters (DACs), i.e., quadrature upconverters. Moreover, the upconverter is sophisticated since it supports all LoRa bandwidth options, typically from 7.8 kHz to 500 kHz. To reduce the cost, a design is presented herein that allows modulation of chirp spread spectrum (CSS) signals directly to passband, and allows supporting multiple SFs at a very low cost.

The conventional LoRa signal is not spectrally efficient because it has large roll-off regions on both sides of the spectrum. This severely limits the number of channels that can be used in a given spectrum. Furthermore, conventional CSS signaling is not orthogonal, which causes interference and degrades link performance. Given these shortcomings, a spectrally-efficient LoRa transmitter is provided in which the spectral roll-off can be controlled and made very small, while orthogonality among chirps is always maintained.

LoRa uses CSS as the modulation type. CSS converts a particular data symbol into a chirp. A chirp is a signal in which the frequency increases or decreases over time. As such, a chirp is also called a sweep signal, and one CSS symbol often sweeps through the bandwidth (BW) once (as in LoRa), or twice (as in IEEE 802.15.4a). When the instantaneous frequency of a CSS signal reaches the highest, it will wrap-over and start from the lowest frequency.

Figure 10:
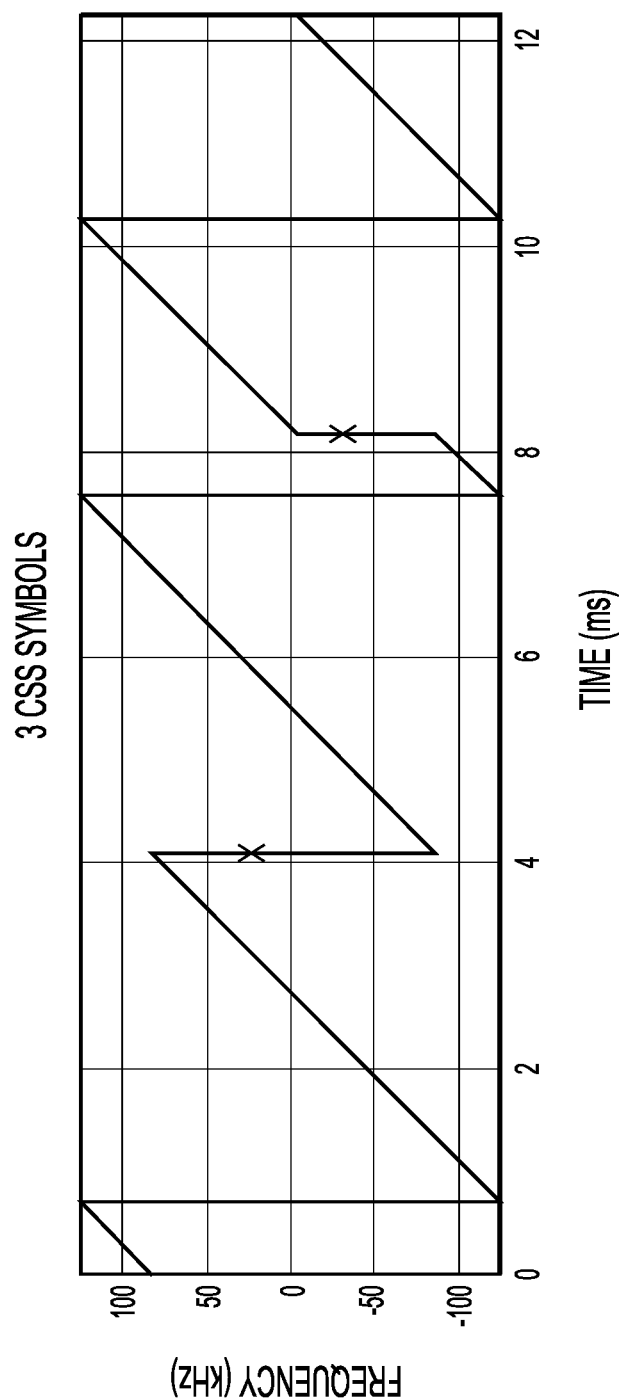
FIG. 10 is an instantaneous frequency over time plot for three up-chirp spread spectrum symbols at baseband.

Before describing in detail an orthogonal chip generator, various CSS waveforms associated with the orthogonal chip generator will first be discussed in connection with FIGS. 10-12. With reference to FIG. 10, there is shown an instantaneous frequency over time for three up-chirp CSS symbols at baseband, for which the signal bandwidth (BW) is 250 kHz and the spreading factor (SF) is 10. In FIG. 10, the label "x" marks CSS symbol boundaries. An important parameter of the LoRa system is spreading factor (SF). A value $M=2^{SF}$ has several meanings in a LoRa system, such as: modulation order, because each LoRa symbol carries SF bits; a number of baseband samples in a LoRa symbol, where one LoRa symbol is simply a cyclically-shifted version of another symbol; and a DFT size used in a LoRa demodulator.

The symbol duration is $T_{sym}=2^{SF}/BW=M/BW$ (seconds). The chirp rate, i.e., the rate in which the frequency of a CSS signal changes over time, can be defined as $BW/T_{sym}$ (Hz/second), in which a positive value denotes an up-chirp and a negative value indicates a down-chirp. CSS modulation produces different signals (or chirps) based on the basic chirp. The basic chirp is a chirp that starts at the lowest frequency, i.e., $-BW/2$, sweeps through the entire bandwidth, and then stops at the highest frequency, i.e., $BW/2$. As such, the basic chirp at baseband is centered at zero frequency and defined by a continuous-time waveform. The instantaneous frequency of the signal at time t is the phase slope of the signal at that moment. That slope can be obtained by taking the derivative of the phase function over time. Thus, (i) the frequency of the basic chirp represents a signal that sweeps through the entire bandwidth BW over the period of $T_{sym}$, and (ii) the center frequency is 0 Hz, i.e., the signal is at baseband.

Figure 11:
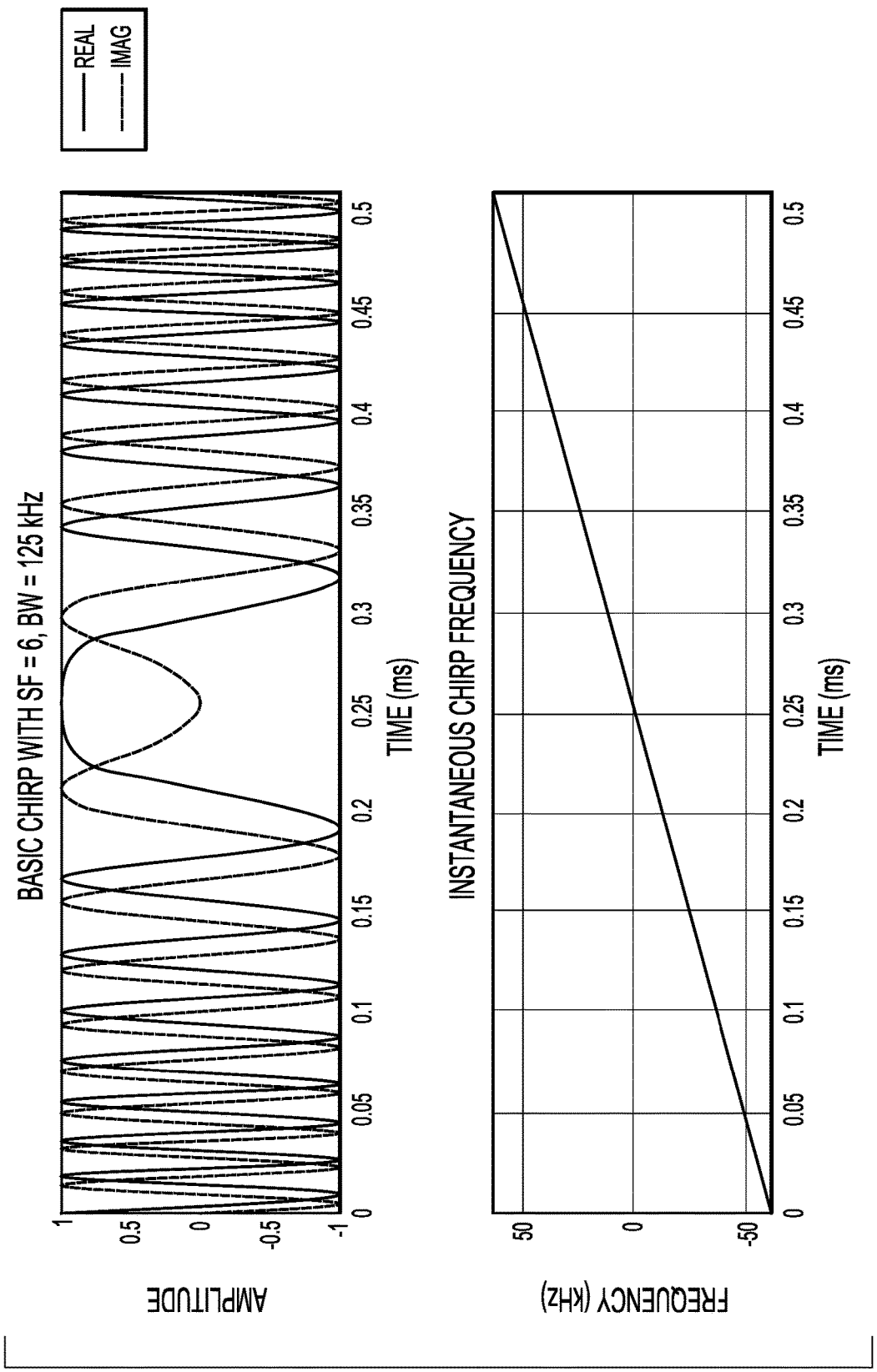
FIG. 11 is an illustration of a basic chirp, along with its instantaneous frequency, plotted over time, according to an example embodiment.

With reference to FIG. 11, there are illustrations of a basic chirp (top plot), along with its instantaneous frequency (bottom plot) plotted over time, for SF=6, BW=125 kHz.

In a CSS chirp including a sequence of multiple symbols, if the basic chirp is denoted as symbol 0, then the next symbol, i.e., symbol 1, can be obtained by cyclically shifting symbol 0 by an amount 1/BW, and so on. As such, there are a total of M different CSS symbols that can be collectively defined across the bandwidth of the CSS chirp.

Figure 12:
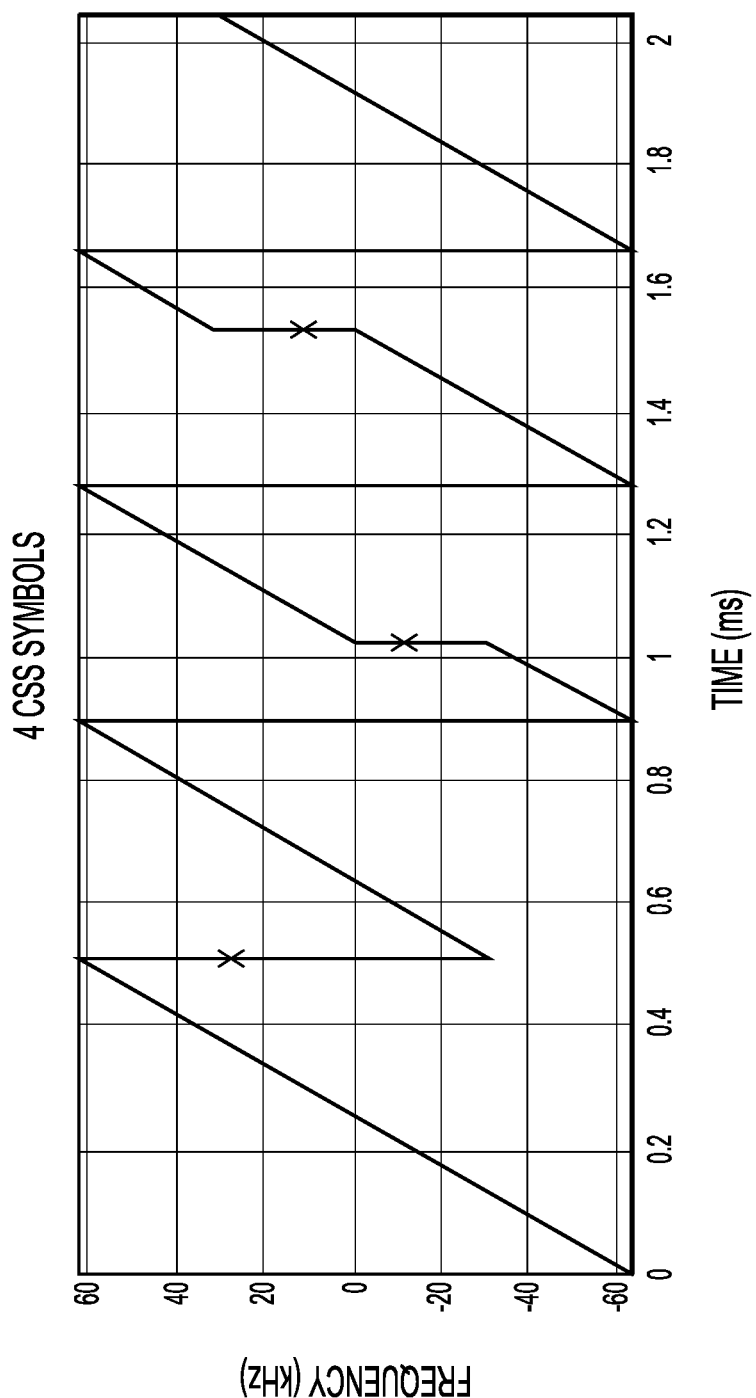
FIG. 12 a frequency plot for four CSS symbols, according to an example embodiment.

With reference to FIG. 12, there is an illustration of an example of the frequency plot for a CSS chirp including 4 CSS symbols, in which each of the symbols carries 6 bits (SF=6), BW=125 kHz.

Figure 1:
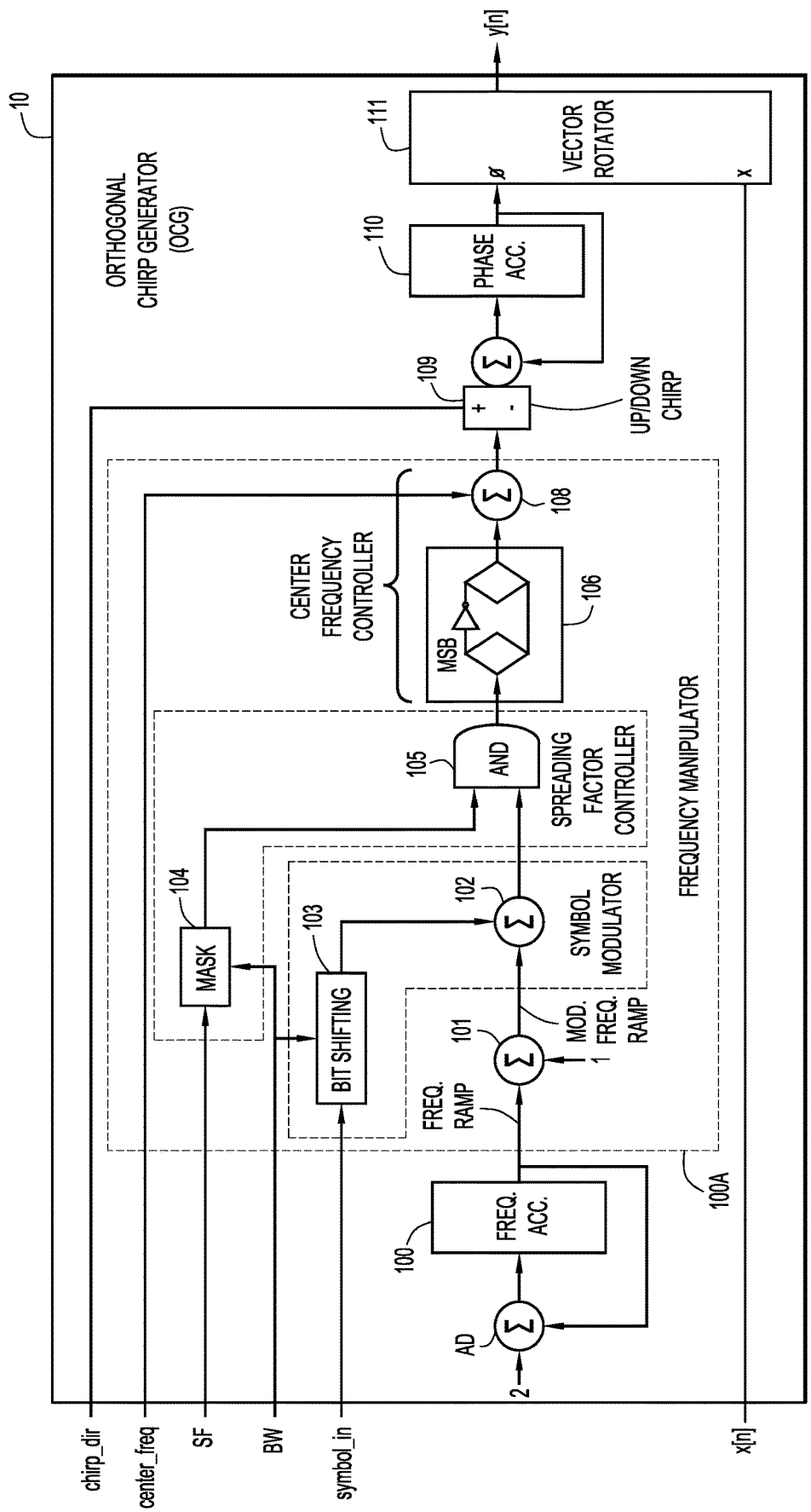
FIG. 1 is a block diagram of an orthogonal chirp generator according to an example embodiment.

Referring now to FIG. 1, a block diagram is shown of an orthogonal chirp generator (OCG) 10 to generate CSS chirps, according to an example embodiment. The OCG 10 is the main component of a CSS transmitter and receiver disclosed herein. In an embodiment, the OCG 10 supports a spreading factor (SF)=[1,15] with a bandwidth ranging from 7.8 kHz to 1 MHz. The OCG 10 supports controlling of chirp directions (up/down), can directly generate an over-sampling version of a baseband chirp, and allows shifting of a center frequency of the chirp.

The OCG 10 receives a set of input signals and generates a modulated chirp (also referred to simply as a "chirp") based on the input signals. The input signals include a chirp direction control signal chirp_dir to control the chirp direction, a center frequency control signal center_freq representative of a desired center frequency of the chirp and that is used to control the center frequency of the chirp, a spreading factor control signal SF representative of a spreading factor of the chirp and that is used to control the spreading factor of the chirp, a bandwidth control signal BW representative of a bandwidth of the chirp and that is used to control the bandwidth of the chirp, a sequence of information symbols symbol_in, used to modulate the chirp, and an input vector x[n]. The OCG 10 comprises 4 main components that are responsive to the input signals: a frequency accumulator 100, a frequency manipulator 100A, a phase accumulator 110, and a vector rotator 111. The first 3 components create the following phase function:

$$\phi[n,m] = \frac{\sum_{k=0}^{n-1}(\text{mod}(2k+1+2mL, 2ML) - ML)}{2ML^2}(\times 2\pi \text{ radians}), \quad (1)$$

In the above expression:
$M=2^{SF}$, where SF is the spreading factor.
L is the over-sampling factor, i.e., $$L = \frac{F_{sys}}{BW},$$

where $F_{sys}$ is the system clock rate.
$n \in [0, ML-1]$ is the time-domain sample index.
$m \in [0, SF-1]$ is the data symbol to be modulated.

The frequency accumulator 100 repetitively accumulates an input word supplied from an adder AD to create a frequency that is linearly increasing over time, i.e., a frequency ramp. The frequency ramp comprises a sequence of frequency samples/words. The width of the accumulator 100 (and thus the corresponding width of words/samples output by the accumulator) is large enough to accommodate the combination of the largest spreading factor with the lowest bandwidth, i.e., $$\text{freq\_acc\_width} = SF_{max} + \log_2\left(\frac{F_{sys}}{BW_{min}}\right) + 1 \text{ (bits)}, \quad (2)$$

where $SF_{max}$ and $BW_{min}$ are the highest spreading factor and the minimum bandwidth supported, respectively.

The frequency manipulator 100A comprises multiple logic elements/modules 101 to 108. Initially, adder 101 adds one extra bit to the frequency ramp output by frequency accumulator 100 to support a half-step frequency correction. Since phase is the integration of frequency over time, the half-step frequency correction applied to the output of the frequency by adder 101 corrects for the difference between discrete and continuous integration of the linearly-changing frequency over time. The output of the half-step frequency correction is the term 2k+1 described in Equation (1). Then, the frequency manipulator 100A introduces jumps into the frequency ramp at symbol boundaries according to (i) each input symbol symbol_in, (ii) selected bandwidth BW according to the bandwidth control signal, and (iii) spreading factor SF according to the spreading factor control signal, to produce a frequency manipulated, modulated frequency ramp that is output from adder 108, as described below. Thus, the frequency manipulator establishes/controls symbol modulation, the spreading factor and bandwidth, and the center frequency of the modulated chirp generated by the OCG 10.

Chirp modulation is performed primarily at adder 102. Adder 102 receives frequency offsets representative of respective ones of the information symbols (i.e., in symbol_in), and adds the frequency offsets to the frequency ramp output by adder 101 at symbol boundaries that are spaced-apart across the frequency ramp, to produce a modulated frequency ramp (i.e., a sequence of samples of the modulated frequency ramp). The added frequency offsets produce "jumps" or discontinuities in the frequency ramp at the symbol boundaries, as shown at each "x" in FIGS. 10 and 12. To obtain each frequency offset, a bit shifter 103 bit-shifts (e.g., left-shifts) each input symbol in symbol_in according to the bandwidth control signal BW to ensure each input has a proper format when added to the frequency ramp at adder 102. The amount of left-shifting depends on the system clock rate (which determines a rate at which samples are shifted left-to-right through the logic elements of the OCG 10) and the desired bandwidth of the generated chirp signal and is given as $$\text{symbol\_in\_left\_shift} = \log_2\left(\frac{F_{sys}}{BW}\right) + 1 = \log_2(L) + 1 \text{ (bits)}. \quad (3)$$

Mathematically, the bit-shifting operation generates the term 2 mL described in Equation (1). Adder 102 and bit-shifter 103 collectively represent an example symbol modulator for the OCG 10.

The spreading factor of the chirp signal is controlled by bit-wise AND gate 105, which performs a bit-wise AND (i.e., a masking operation) against a mask (generated by a mask generator 104) and the modulated ramp frequency samples output by adder 102 (i.e., against the modulated frequency ramp). Mask generator 104 creates the mask based on the SF and BW control signals. The mask controls how fast the frequency of the modulated frequency ramp rolls over (i.e., the roll-over rate of the modulated frequency ramp). The mask has the same width as the frequency accumulator. The $\log_2(ML)+1$ least significant bits of the mask are all ones, while the remaining bits are all zeros. The mask operation performed by the bit-wide AND gate 105 performs the modulo-by-2ML operation described in the Equation (1). For example, with a given BW, if the SF is reduced by one, the mask operation will mask off one more bit at the top of the frequency sample, effectively making the frequency roll over twice as fast. The opposite can be said if the BW is reduced by one. Mask generator 104 and bit-wise AND gate 105 collectively represent an example spreading factor controller of the OCG 10.

Frequency centering of the masked modulated frequency ramp is performed next. Following the bit-wise AND gate 105, a most significant bit (MSB) inverter circuit 106 inverts the MSB of each masked modulated frequency ramp sample output from the AND gate, to center the frequency spectrum of the modulated frequency ramp at 0 Hz. That is, each masked modulated frequency ramp sample is represented as a respective word having bits that range from a least-significant-bit (LSB) to an MSB, and MSB inverter circuit 106 only inverts the MSB of the word. Inverting the MSB changes the number format of the masked modulated frequency ramp sample from unsigned to signed. In particular, before inverting, the frequency of the modulated frequency ramp rolls over at 0 and BW, but after inverting the frequency rolls over at –BW/2 and +BW/2, respectively. Mathematically, spectrum centering is represented as the term –ML in Equation (1). An adder 108 directly adds to the inverted frequency sample output by inverter 106 the actual center frequency of the chirp based on the center frequency control signal center_freq. The center frequency control signal center_freq includes a control word that has the same width as the frequency accumulator, as such, the center frequency resolution is $F_{sys}$/freq acc width (Hz). MSB inverter 106 and adder 108 collectively represent an example center frequency controller of the OCG 10.

The phase accumulator 110 performs discrete integration of the frequency samples to provide phase samples for the generated chirp symbol (i.e., modulated chirp). There is a selective inverter 109, located at the input to the phase accumulator, to control the chirp direction, i.e., up-chirp or down-chirp responsive to the chirp direction control signal chirp_dir. Mathematically, the phase accumulator 110 performs the main summation in Equation (1).

Finally, the vector rotator 111 performs phase rotation by an amount of $\phi[n,m]$ on input vector $x[n]$ as $$y[n, m] = x[n]\exp\{i2\pi\phi[n, m]\} = x[n]\exp\left\{-i2\pi\left(\frac{m^2}{2M} - \frac{m}{2}\right)\right\} \times \quad (4)$$
$$\exp\left\{i2\pi\left(\frac{\text{mod}(n+mL, ML)^2}{2ML^2} - \frac{\text{mod}(n+mL, ML)}{2L}\right)\right\},$$

where $x[n]$ is the input vector and $y[n,m]$ is an output vector representing the modulated chirp, and $y[n,m]$ is a complex signal that includes real and complex components.

To generate a continuous-phase chirp signal, the input vector $x[n]$ is set to a scalar, which is determined by the magnitude of the chirp signal. Alternatively, when a continuous phase is not required between two adjacent chirp symbols, extra data information can be encoded as the phase of the input vector.

The vector rotator can be built effectively using a pipelined coordinate rotation digital computer (CORDIC). Since the CORDIC can be built without multiplication, the OCG 10 does not consume any hardware multipliers.

Figure 2:
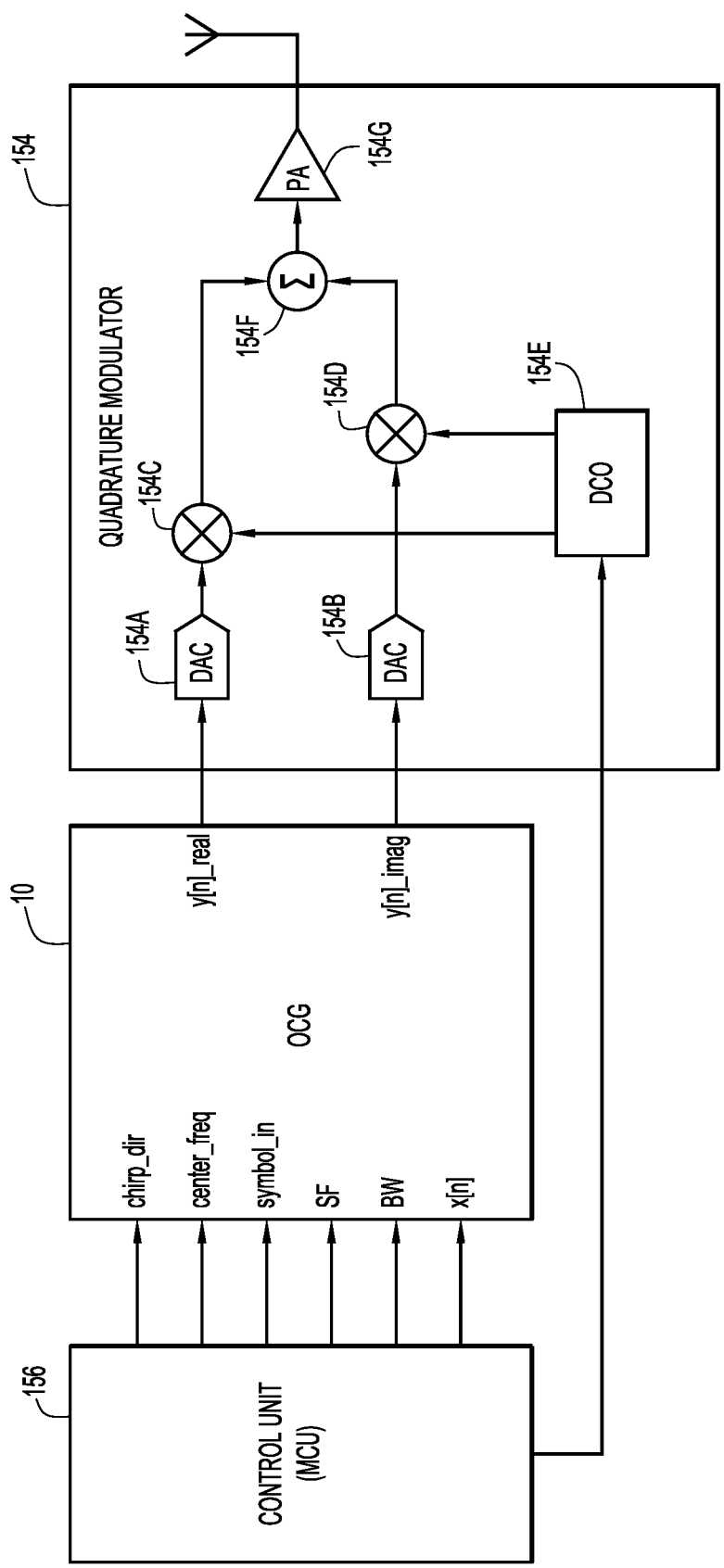
FIG. 2 is a block diagram showing single sideband up-conversion of a chirp signal using the orthogonal chirp generator and a quadrature modulator, according to an example embodiment.

With reference to FIG. 2, there is shown a block diagram of an example chirp transmitter that includes the OCG 10 combined with a quadrature modulator 154 to upconvert the chirp signal to passband (e.g., radio frequency (RF)), and a microcontroller control unit (MCU) 156. MCU 156 provides to inputs of the OCG 10 the signals chirp_dir, center_freq, symbol_in, SF, BW, and vector $x[n]$. In response, the OCG 10 generates in-phase y[n]_real and quadrature y[n]_imag components of a modulated chirp, and provides the components to the quadrature modulator 154. The quadrature modulator 154 converts the in-phase and quadrature components to analog signals using a pair of DACs 154A and 154B. The quadrature modulator 154 contains a digitally-control oscillator (DCO) 154E, whose outputs are two sinusoids having 90-degree phase difference and at a passband frequency. The two sinusoids are individually mixed at mixers 154C and 154D with the in-phase and quadrature components before adding together at summer 154F, giving a single sideband (SSB) spectrum centered at the passband frequency. Settings of the OCG 10 and frequency of the DCO are configured by a control unit, which can be a microcontroller or a finite state machine. A signal output by summer 154F is amplified and transmitted by a power amplifier (PA) 154G.

Figure 3:
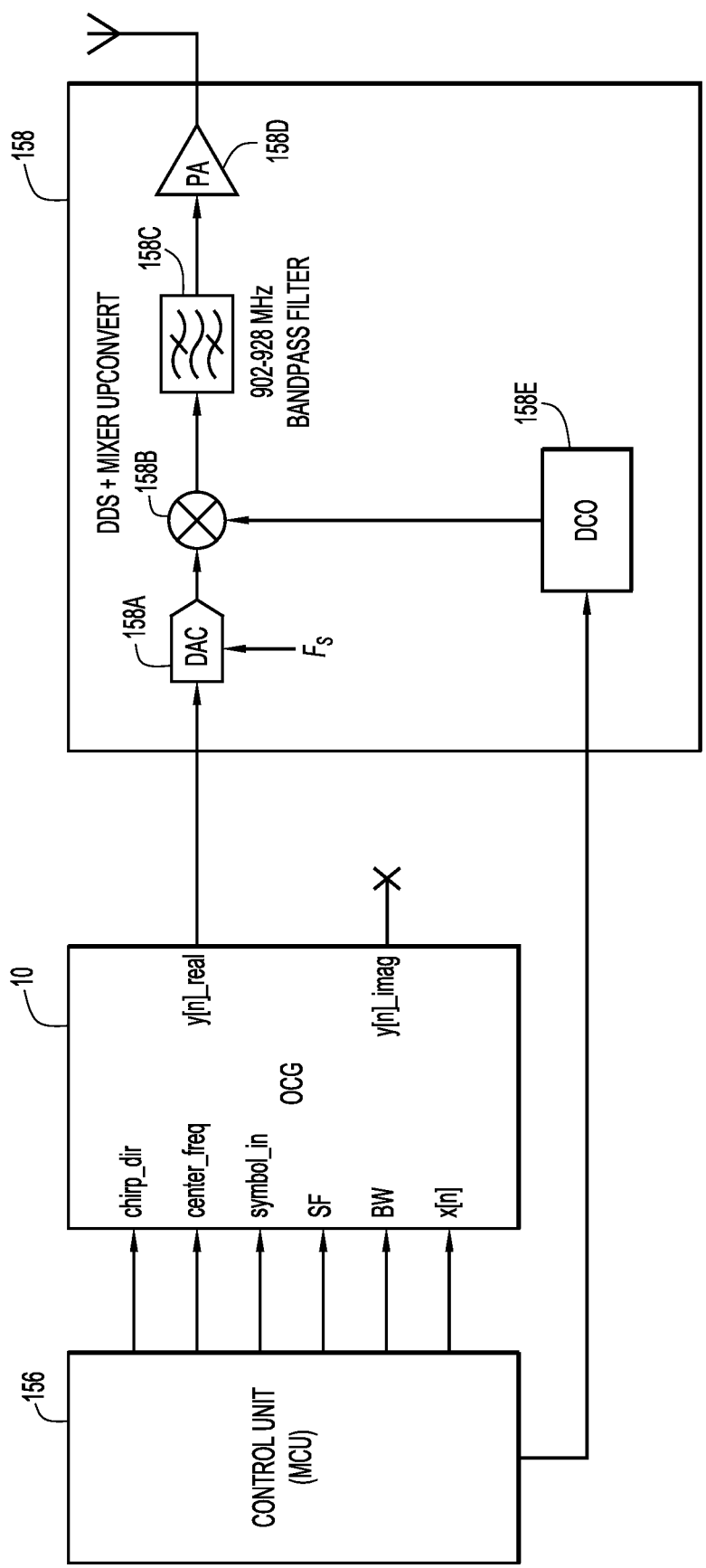
FIG. 3 is a block diagram showing double sideband up-conversion of a chirp signal using the orthogonal chirp generator and a digital direct synthesis and mixer component, according to an example embodiment.
Figure 4:
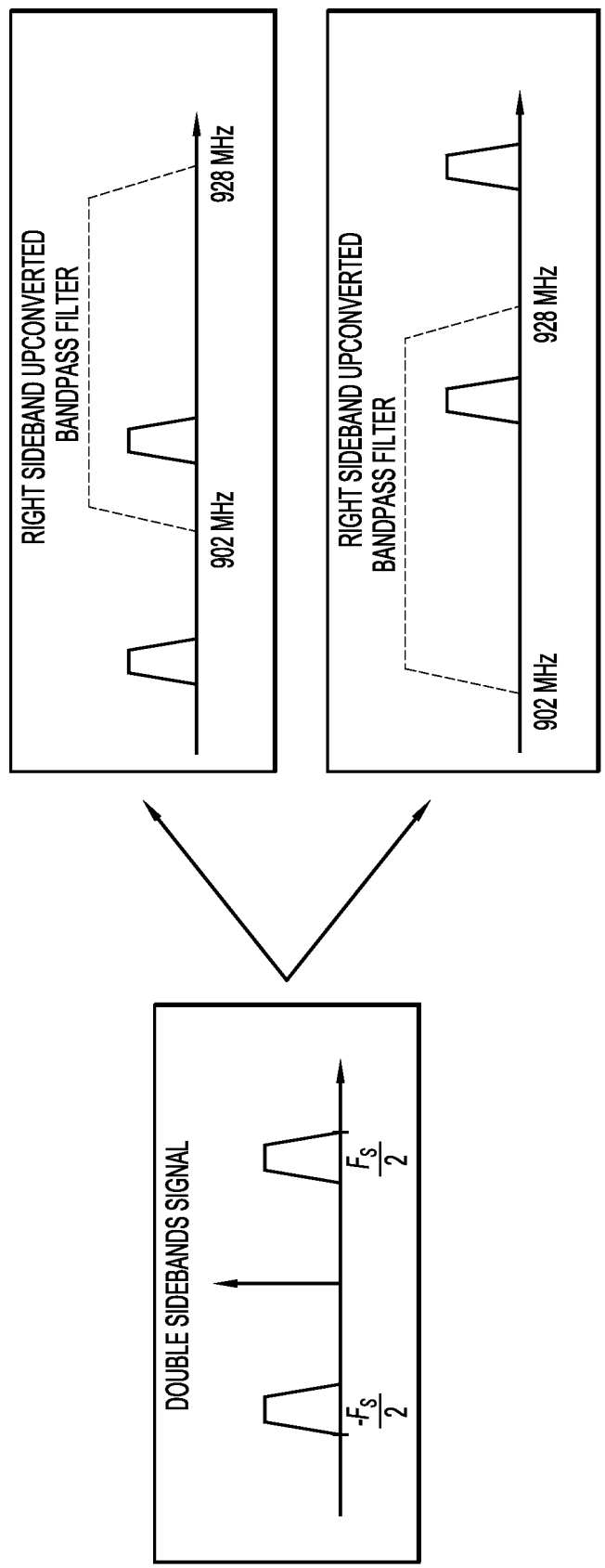
FIG. 4 is a diagram showing how the orthogonal chirp generator can be used to select a left or a right sideband for up-conversion, according to an example embodiment.

To reduce the cost of the upconverter, a direct digital synthesis (DDS) technique can be used as illustrated in FIGS. 3 and 4, which uses a DDS+mixer upconverter 158 instead of the quadrature modulator 154 of FIG. 2. In particular, in FIG. 3, the OCG 10 is configured with a non-zero center frequency so that the signal spectrum is pushed close to the Nyquist rate. As shown in FIG. 3, only the in-phase component at the output of the OCG 10 is sent to a DAC 158A of the DDS+upconverter 158. The single DAC 158A generates a double sideband (i.e., real) signal, as shown on the left-hand side of FIG. 4, and a mixer 158B mixes the sidebands with a carrier controlled by a DCO 158E. A bandpass filter 158C (e.g., 902-928 MHz filter) after the mixer removes one sideband to prevent undesirable interference. A power amplifier 158D amplifies and transmits the remaining sideband.

The control unit 156 determines whether to keep the left or the right sideband based on the center frequency of the chirp signal, as shown on the right-hand side of FIG. 4. For example, given the band of operation from 902 MHz to 928 MHz, the right sideband is kept if the carrier frequency is less than 915 MHz (see the top frequency spectrum on the right-hand side of FIG. 4), and the left sideband is kept otherwise (see the bottom frequency spectrum on the right-hand side of FIG. 4). In doing so, the required frequency separation between the two sidebands is minimized, which means the DAC can run at a lower rate, i.e., $F_S$=16 MHz is sufficient. In case the left sideband is selected, it would need to invert the signal spectrum, which can be done simply by inverting the OCG 10's chirp_dir signal.

The vector input x[n] can be used to alter the amplitude and phase of the generated chirp symbol as follows:

Applying a power scaling factor to a chirp when x is a scalar. In this case, the CSS signal coming out of the OCG 10 has continuous phase, i.e., each CSS symbol starts and ends at zero phase. Phase continuity among CSS symbols is particularly important for frequency and time synchronization.

Applying phase rotation to a chirp when x is a unit-magnitude complex number. In this case, each chirp symbol starts and ends at the phase defined by the input x. This provides the opportunity to encode extra bits into the phase information of each chirp symbol.

Figure 5:
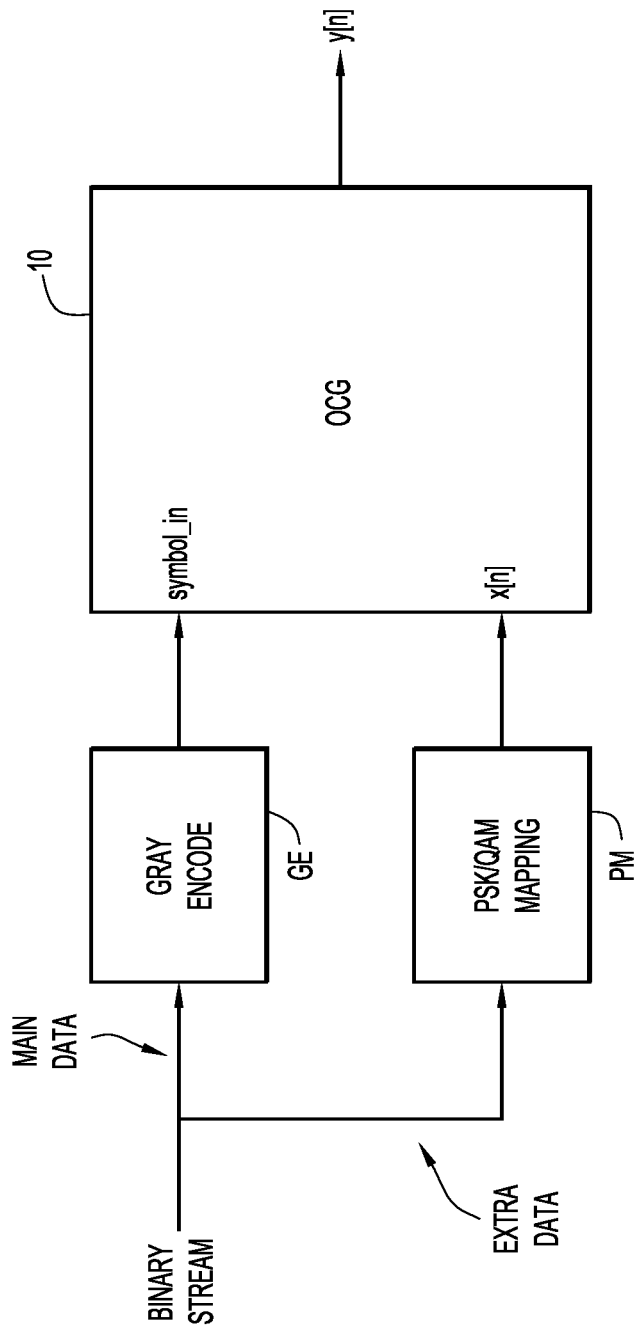
FIG. 5 is a diagram showing the orthogonal chirp generator using phase and/or amplitude of a chirp symbol to encode extra data bits, according to an example embodiment.

Applying both amplitude and phase rotation to a chirp when x is a general complex number. This allows to encode extra bits into both the amplitude and phase information of each chirp symbol. The extra bits can be used to carry data information. Alternatively, the extra bits can be used to carry parity bits, giving more protection to the main data (as shown in FIG. 5). In this case, a simple non-coherent receiver can still be able to decode the data normally, but a more sophisticated receiver can decode the signal coherently, taking advantage of the extra parity bits to obtain higher decoding performance. More specifically, with reference to FIG. 5, there is an illustration of a method of using phase and/or amplitude of a chirp symbol to encode extra data bits. Moving left-to-right in FIG. 5, a Gray encoder GE Gray encodes main data of a binary stream produce symbols symbol_in for the OCG 10. In parallel, a PSK/QAM mapper PM applies PSK/QAM mapping to extra data, e.g., parity bits from the Gray encoder GE or other extra data, to produce the input vector x[n] for the OCG 10.

Figure 6:
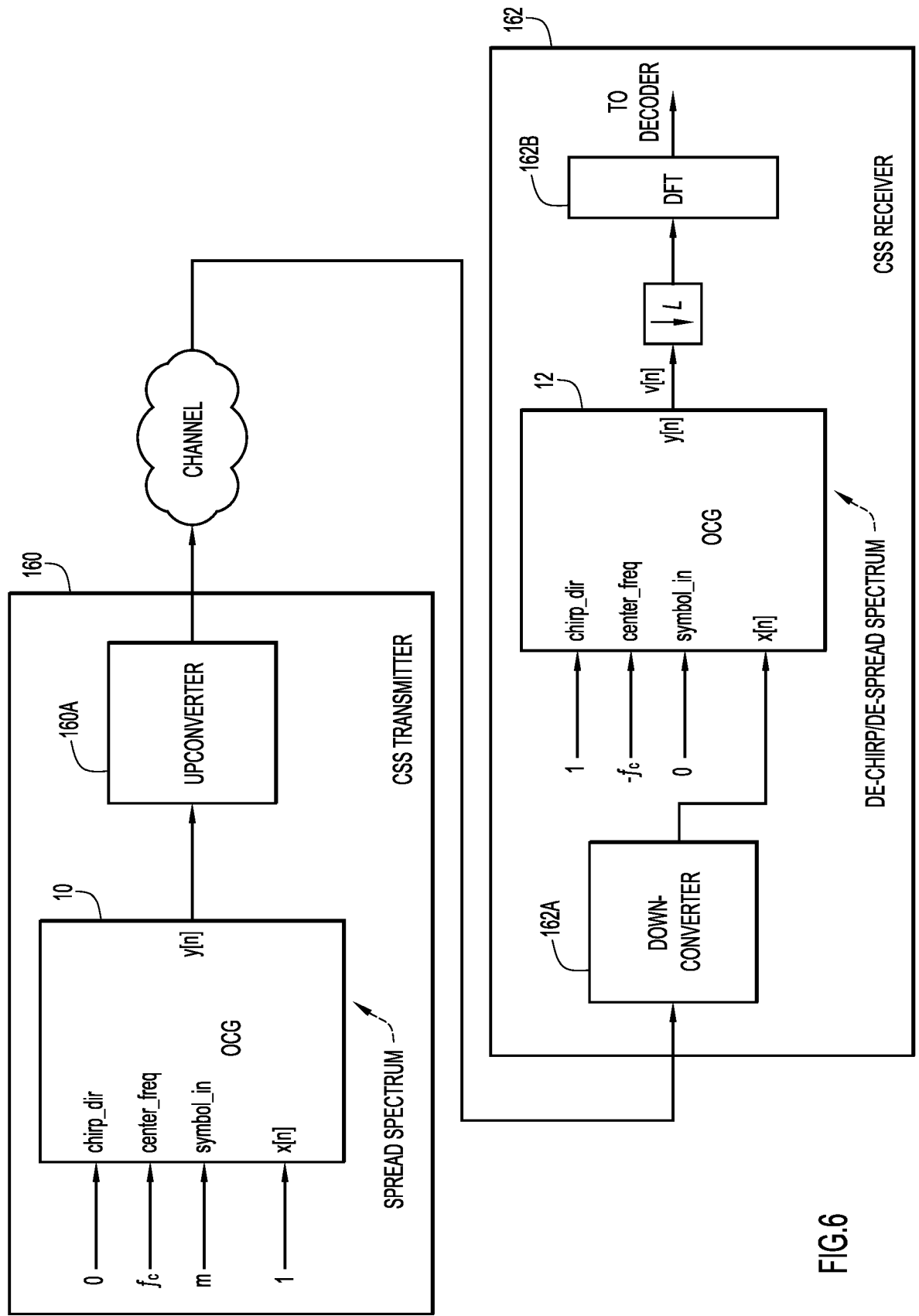
FIG. 6 illustrates a chirp spread spectrum (CSS) system including a CSS transmitter that includes the orthogonal chirp generator to produce a chirped signal and a CSS receiver that includes an orthogonal chirp generator configured to de-chirp the chirped signal, according to an example embodiment.

With reference to FIG. 6, there is shown a block diagram in which the OCG 10 is used in both a CSS transmitter 160 and a CSS receiver 162. The CSS transmitter 160 includes the OCG 10 to generate a modulated chirp at baseband, and an upconverter 160A following the OCG 10 to frequency upconvert the baseband chirp to a radio frequency (RF) modulated chirp and transmit the RF modulated chirp through a channel. The CSS receiver 162 includes a downconverter 162A to receive the RF modulated chirp, frequency downconvert the RF modulated chirp to a modulated chirp at baseband, and deliver the baseband modulated chirp to the input vector x[n] of an OCG 12 (configured similarly to the OCG 10, but with inputs configured to cause the OCG 12 to de-chirp the modulated chirp), which de-chirps/despreads the spectrum of the baseband modulated chirp applied to input vector x[n], to produce a signal v[n] after de-chirping.

The signal v[n] after de-chirping is down-sampled at a down-sampler ↓L, and then transformed to the frequency domain using a discrete Fourier transform (DFT) 162B of size M. Under ideal channel condition, the output of the DFT has energy concentrated in a single bin, whose location indicates the demodulated symbol. The chirp direction input on the receiver's OCG 12 has to be opposite to that at the transmitter. The pair of upconverters/downconverters 162A and 162B can be either single sideband (i.e., dual ADCs) or double sideband (i.e., single ADC). In case the receiver uses a single ADC to sample the double sideband signal, de-chirping is performed on an over-sampled signal, and thus its output needs to be down-sampled to baseband before performing DFT.

As mentioned above, the OCG 12 is used in the receiver 162 to de-chirp the CSS signal produced by the transmitter 160. In particular, de-chirping unwinds the second-order phase function applied at the receiver, leaving the linear phase term remained as $$y_{dechirped}[n] = y[n, m]\exp\{-i2\pi\phi[n, 0]\} \quad (5)$$

$$= \begin{cases} x[n]\exp\left(i2\pi\dfrac{nm}{ML}\right), & \text{if } n + mL < ML \\ x[n]\exp\left(i2\pi\dfrac{n(m-M)}{ML}\right), & \text{otherwise} \end{cases},$$

so that the signal after de-chirped and downconverted is a sinusoid whose frequency depends on the modulated symbol. With reference to FIG. 6, there is shown an example of de-chirping OCG, in which the configurations for the de-chirping OCG are:

Signal to be de-chirped is sent to the input x[n] of the de-chirping OCG.

The input symbol to the de-chirping OCG is set to 0.

The chirp direction is set to be the opposite of that in the transmitter's OCG.

center_freq is set to be the negative of that in the transmitter's OCG.

Assuming (i) the chirp to be de-chirped by the OCG 12 includes a repeating frequency ramp that has frequency offsets representative of symbols added to the frequency ramp at symbol boundaries, has a known spreading factor represented by SF, has a known center frequency represented by center_freq ($f_c$), has a known bandwidth represented by BW, and has a known chirp direction represented by chirp_dir (=0), and (ii) the OCG 12 receives the above-mentioned control inputs (as shown in FIG. 6), then the OCG 12 performs the following operations to de-chirp the chirp:

a. The frequency accumulator 100 of the OCG 12 repetitively accumulates the input word to produce a frequency ramp;
   b. The symbol modulator (102, 103) of the OCG 12 does not add frequency offsets representative of symbols at symbol boundaries to the frequency ramp, as is done in the OCG 10, because the symbols of symbol_in are set to 0;
   c. The spreading factor controller (104, 105) of the OCG 12 controls a roll-over rate of the frequency ramp responsive to the spreading factor control signal representative of the known spreading factor (SF) and a frequency bandwidth control signal representative of the known bandwidth (BW) (both control signals are received as inputs to OCG 12);
   d. The center frequency controller (106, 108) of the OCG 12 controls a center frequency of the frequency ramp responsive to a center frequency control signal ($-f_c$) representative of a negative of the known center frequency center_freq ($f_c$) (i.e., shifts the center frequency of the ramp in the opposite direction to the direction imposed by the OCG 10 and by an amount equal to that imposed by the OCG 10);
   e. The selective inverter 109 of the OCG 12 controls the chirp direction responsive to a chirp_dir control signal that is opposite in sign (i.e., the negative of) the chirp_dir signal used by the OCG 10 to generate the chirp. The selective inverter 109 inverts the direction of the frequency ramp, if necessary. That is, the directional inverter 109 controls the direction of the frequency ramp responsive to chirp direction control signal chirp_dir, such that the direction is one of an increasing frequency or a decreasing frequency that is opposite to a direction of the repeating frequency ramp of the chirp generated by the OCG 10;
   f. The phase accumulator 110 of the OCG 12 accumulates frequency samples of the frequency ramp with the controlled roll-over rate and the controlled center frequency, to produce phase samples; and
   g. The vector rotator 111 of the OGC 12 rotates the phase samples based on samples of the modulated chirp applied to the x[n] input, to produce a de-chirped signal y[n] including the symbols.

Figure 7:
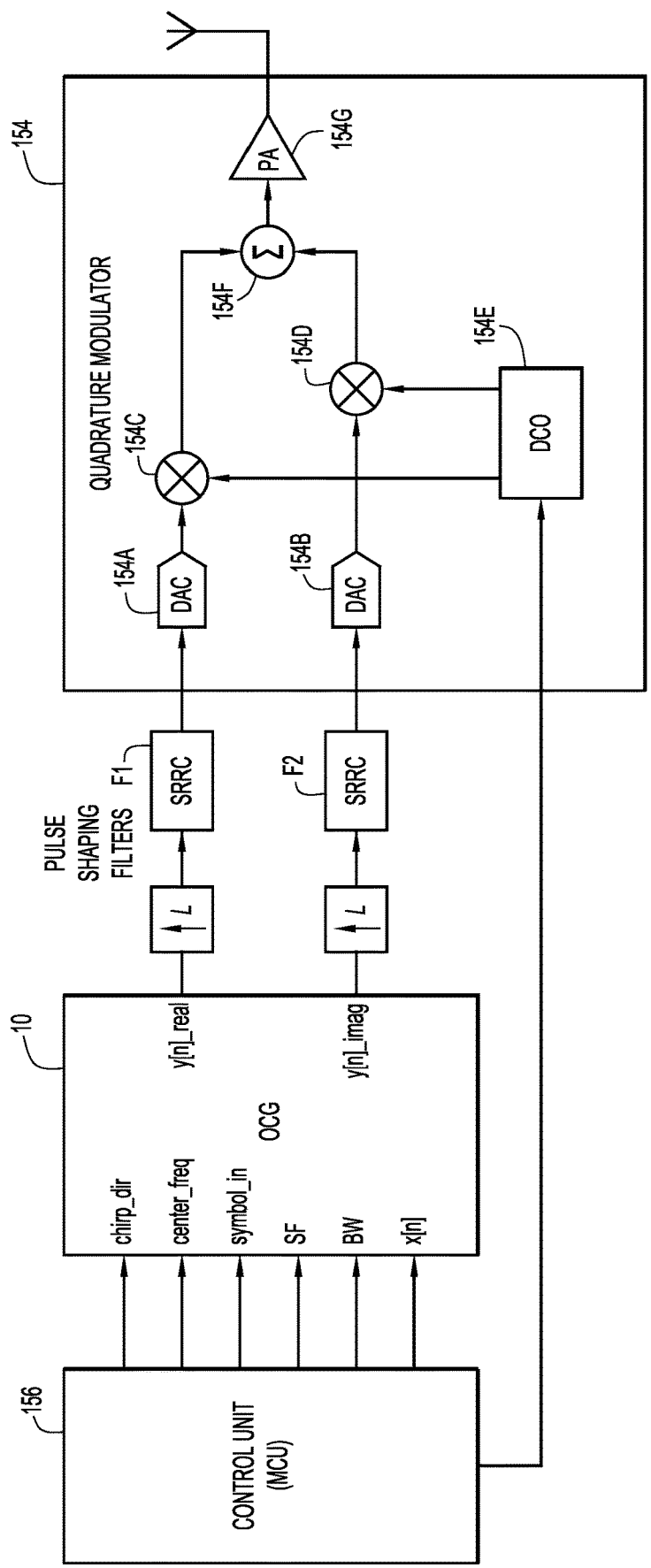
FIG. 7 illustrates how the orthogonal chirp generator may be used with square-root raised-cosine (SRRC) pulse shaping filters, according to an example embodiment.

With reference to FIG. 7, there is a block diagram of the arrangement of FIG. 2, modified to include a pair of up-samplers ↑L and a pair of pulse shaping filters F1 and F2 following the up-samplers. The pair of pulse shaping filters F1 and F2 reduce the out-of-band portion of the CSS spectrum. For example, the filter pair can be selected to be square-root raised-cosine (SRRC) filters.

Figure 8A:
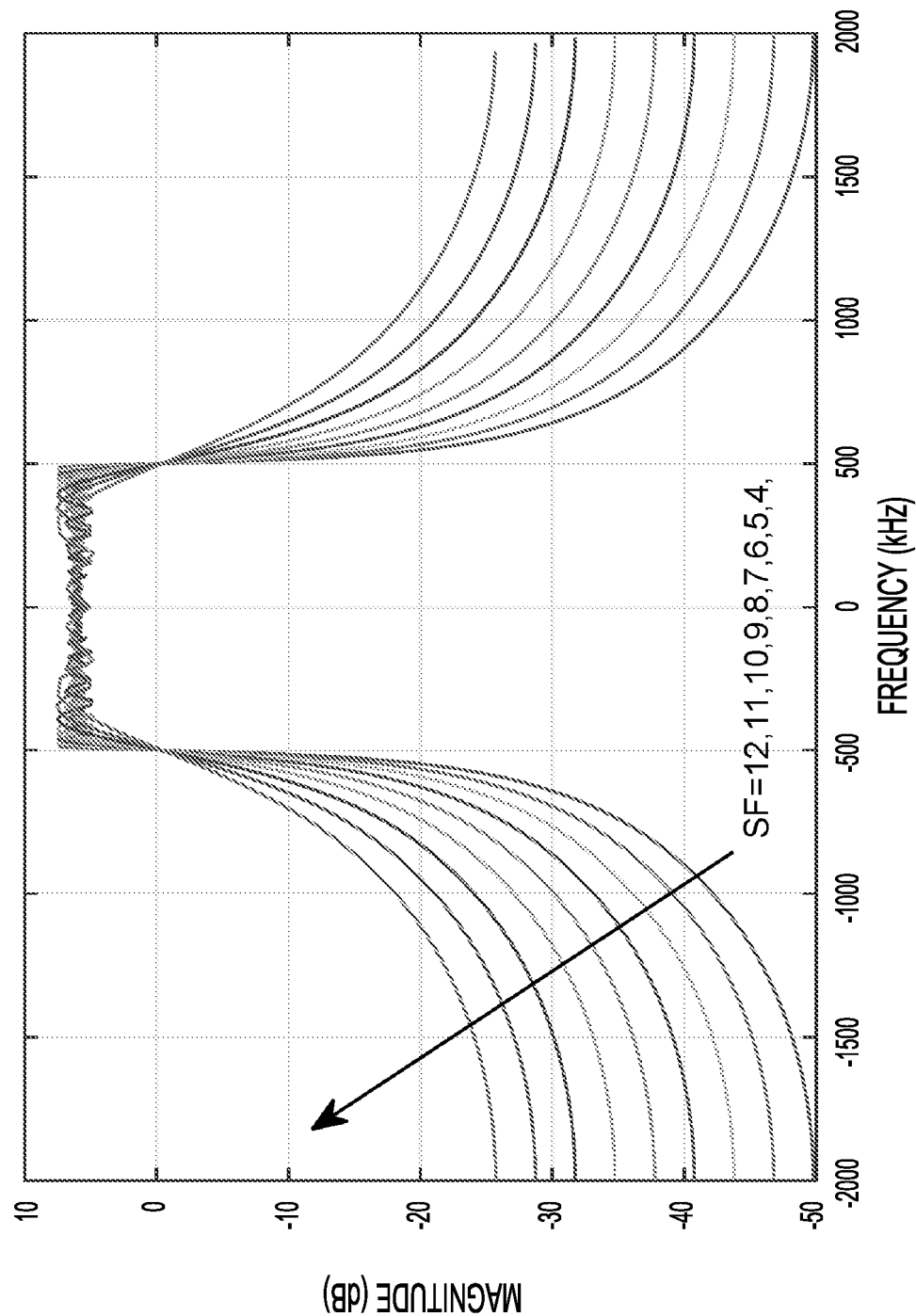
FIG. 8A illustrates power spectra of a conventional CSS signal.
Figure 8B:
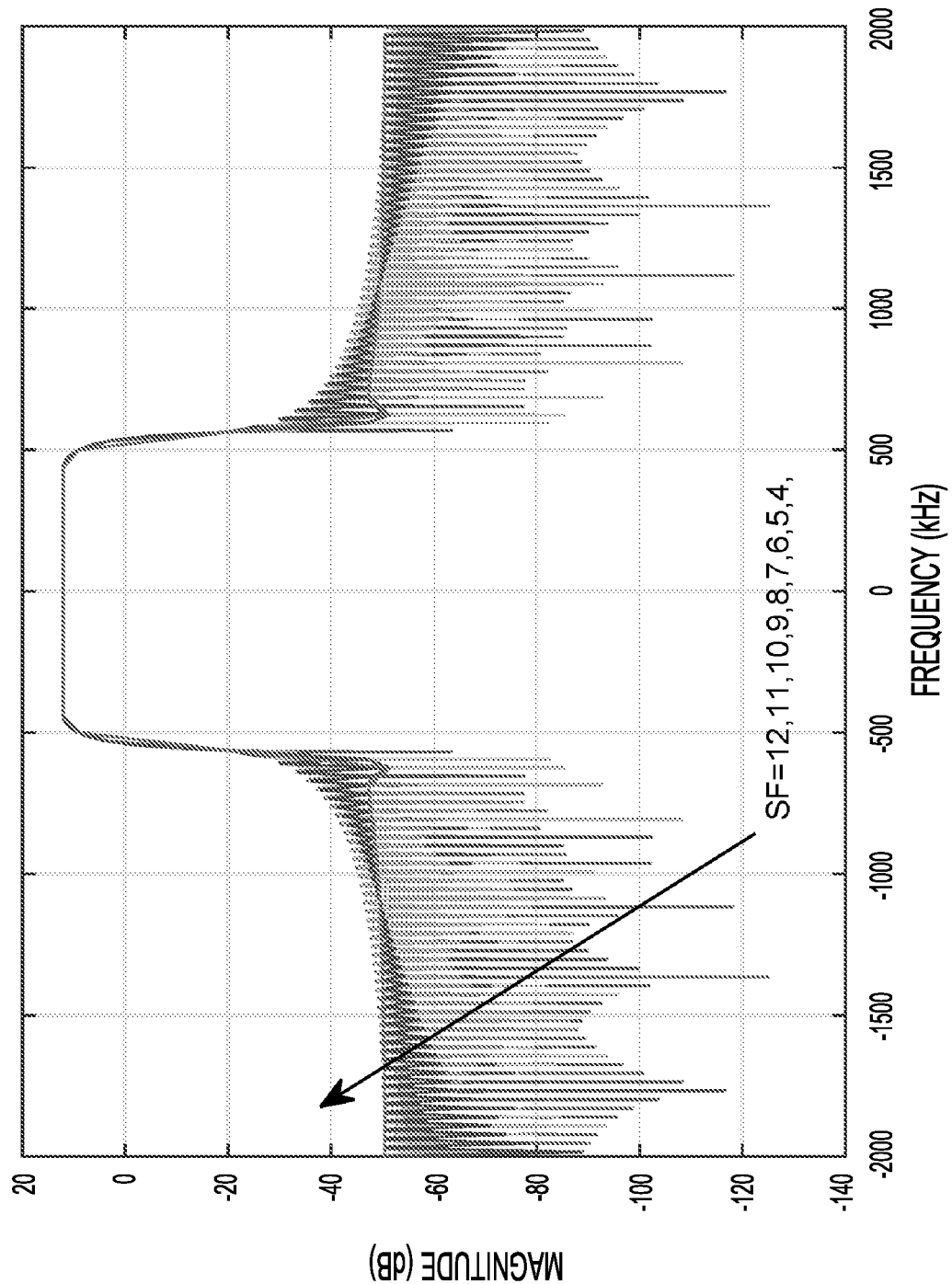
FIG. 8B illustrates power spectra of a CSS signal generated using the orthogonal chirp generator presented herein, according to an example embodiment.

With reference to FIGS. 8A and 8B, there are shown power spectra that demonstrate that the CSS spectral roll-off may be controlled by adjusting the roll-off factor of the pulse shaping filters. FIG. 8A shows the power spectrum of the conventional CSS signal, while FIG. 8B shows the power spectrum of a modified CSS signal with pulse shaping filters with a roll-off factor=0.12, at various settings of the spreading factor. The CSS receiver may also employ a pair of SRRC matched filters so that no inter-symbol interference (ISI) occurs, hence maintaining the orthogonality among chirps.

Embodiments presented above are directed to a highly-efficient design for OCG 10 to generate a modulated chirp (or OCG 12 to de-chirp the modulated chirp). The OCG 10 (or OCG 12) supports a wide range of parameter settings, providing efficient methods for modulating binary data into orthogonal CSS signals, and demodulating CSS signals back to binary data.

There are several advantages offered by this OCG design. First, the OCG consists of 2 accumulators and a CORDIC, thus having very low complexity. Moreover, the OCG is scalable, i.e., modification to support more SF and BW values comes at virtually no cost. Second, the OCG provides excellent flexibility in the transmitter design, i.e., it can be used directly with either quadrature upconverter or DDS. The OCG also reduces the cost of the receiver by not requiring LUT or hardware multipliers. Finally, the OCG opens the opportunity to encode extra information into the phase and/or amplitude of the CSS signal. The feature can be made backward-compatible by using the extra channel to carry additional parity bits, which can only be decoded using a coherent receiver. In such a case, the legacy non-coherent receiver is still able to decode the CSS signal normally, while the more advance coherent receiver can take advantage of the extra data to achieve better decoding performance.

Figure 9:
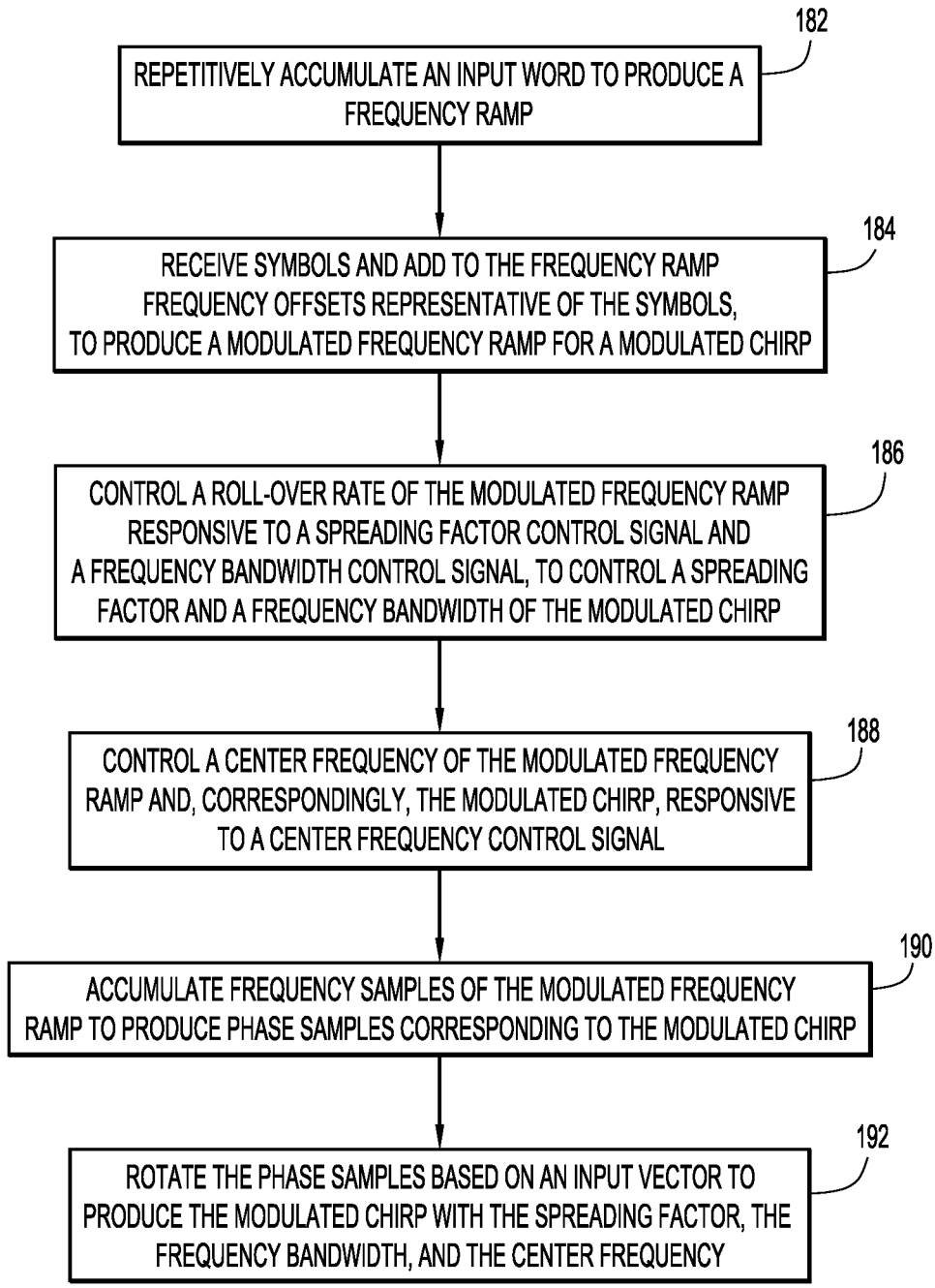
FIG. 9 is a flowchart of a method of generating a modulated chirp performed by the orthogonal chirp generator, according to an example embodiment.

With reference to FIG. 9, there is a flowchart of an example method 180 of generating a modulated chirp performed by the OCG 10. Method 180 includes operations described above.

At 182, frequency accumulator 100 repetitively accumulates an input word to produce a (base) frequency ramp that forms the basis for the modulated chirp to be generated.

At 184, a symbol modulator (e.g., adder 102, bit shifter 103) receives symbols and adds to the frequency ramp frequency offsets representative of the symbols at symbol boundaries spaced apart across the frequency ramp, to produce a modulated frequency ramp for the modulated chirp (e.g., for modulated chirp y[n]).

At 186, a spreading factor controller (e.g., mask generator 104, AND gate 105) controls a roll-over rate of the modulated frequency ramp responsive to a spreading factor control signal (e.g., SF) and frequency bandwidth control signal (e.g., BW), to control a spreading factor and a frequency bandwidth of the modulated chirp.

At 188, a center frequency controller (e.g., MSB inverter 106, adder 108) controls a center frequency of the modulated frequency ramp and, correspondingly, the modulated chirp, responsive to a center frequency control signal (e.g., center_freq). In an embodiment in which the spreading factor controller outputs the modulated frequency ramp such that the modulated frequency ramp has a frequency spectrum that is not centered at zero Hertz, the center frequency controller centers the frequency spectrum at zero Hertz, and adds to the frequency spectrum centered at zero Hertz a frequency offset represented by the center frequency control signal.

At 190, phase accumulator 110 accumulates frequency samples of the modulated frequency ramp to produce phase samples corresponding to the modulated chirp.

At 192, vector rotator 111 rotates the phase samples based on an input vector (e.g., x[n]) to produce a modulated chirp with the spreading factor, the frequency bandwidth, and the center frequency. In an embodiment, the modulated chirp comprises complex baseband samples each having an in-phase (real) component and a quadrature (imaginary) component.

In an embodiment, operations 182-192 of method 180 are performed without any multiply or divide operations.

Figure 13:
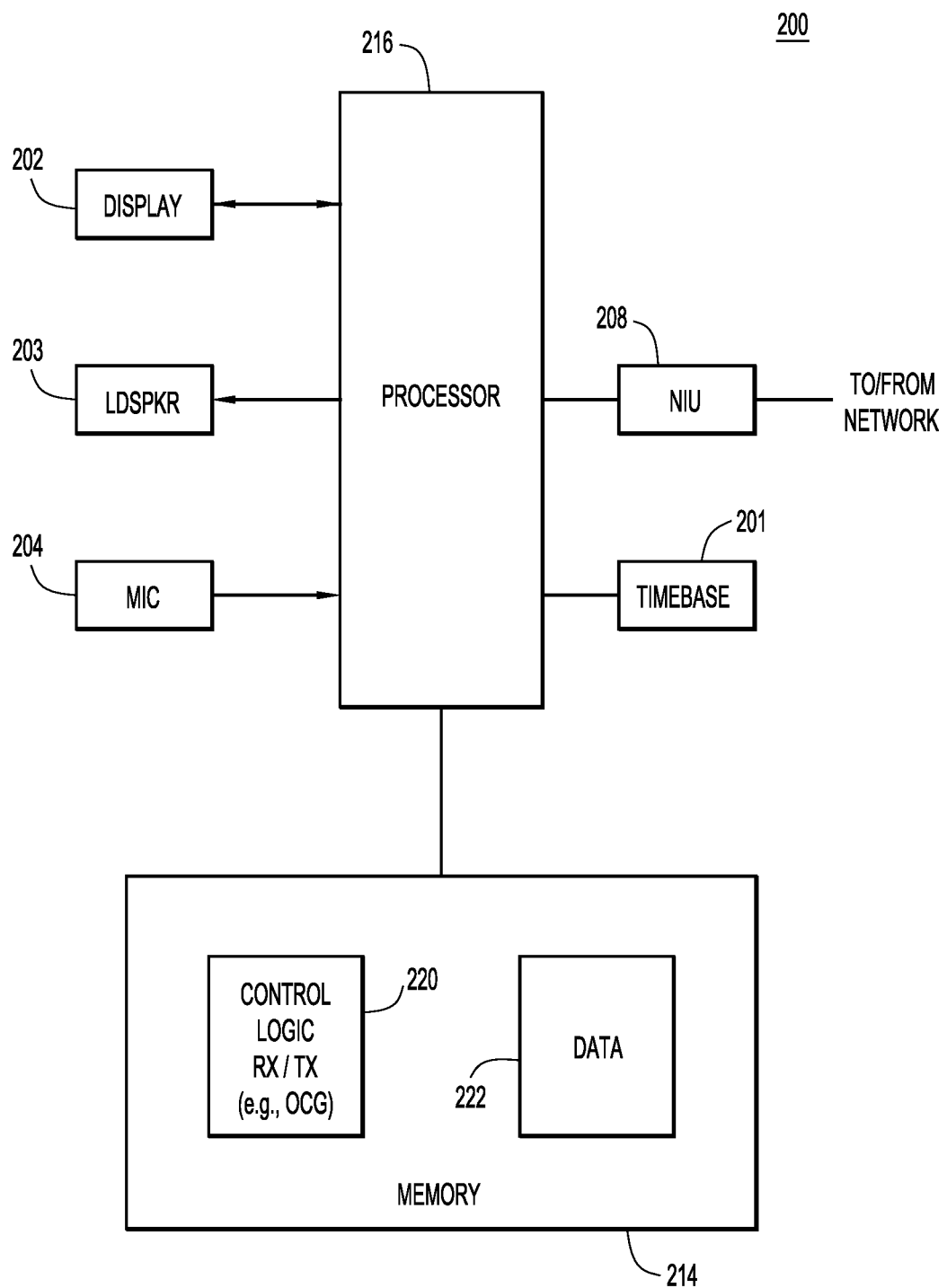
FIG. 13 is a block diagram of a communication device in which the transmitter and the receiver, including the orthogonal chirp generator, may be implemented, according to an example embodiment.

With reference to FIG. 13, there is a block diagram of an example communication device 200 in which the transmitter (TX) and the receiver (RX), including the OCGs 10 and 12, described above may be implemented. There are numerous possible configurations for device 200 and FIG. 13 is meant to be an example. Examples of device 200 include a tablet computer, a personal computer, a laptop computer, a mobile phone, such as a smartphone, or a video conference endpoint. Device 200 may include a timebase 201, a display 202, a loudspeaker 203, a microphone 204, one or more network interface units (NIUs) 208, and memory 214 each coupled to a processor 216. The one or more NIUs 208 may include wired and/or wireless connection capability that allows processor 216 to communicate over a communication network. For example, NIUs 208 may include an Ethernet card to communicate over an Ethernet connection, a wireless RF transceiver to communicate wirelessly with cellular networks in the communication network, optical transceivers, and the like, as would be appreciated by one of ordinary skill in the relevant arts.

Processor 216 may include a collection of microcontrollers and/or microprocessors, for example, each configured to execute respective software instructions stored in the memory 214. Processor 216 may be implemented in one or more programmable application specific integrated circuits (ASICs), firmware, or a combination thereof. The collection of microcontrollers may include, for example: a video controller to receive, send, and process video signals or images related to display 202; an acoustic processor to receive, send/transmit, and process acoustic/sound signals related to the loudspeaker 203 and the microphone 204; baseband processors to generate modulated chirps and de-chirp modulated chirps at baseband; a quadrature modulator; a quadrature demodulator; and a high-level controller to provide overall control of device 100. Portions of memory 214 (and the instructions therein) may be integrated with processor 216.

The memory 214 may include read-only memory (ROM), random access memory (RAM), magnetic disk storage media devices, optical storage media devices, flash memory devices, electrical, optical, or other physical/tangible (e.g., non-transitory) memory storage devices. Thus, in general, the memory 214 may comprise one or more computer-readable storage media (e.g., a memory device) encoded with software comprising computer executable instructions and when the software is executed (by the processor 216) it is operable to perform the operations described herein. For example, the memory 214 stores or is encoded with instructions for control logic 220 to perform operations described herein related to the transmitter and the receiver described above, e.g., to implement signal processing modules as described above, including the OCGs 10 and 12. In an example, control logic 220 causes the processor to instantiate/implement the OCGs 10 and 12, and other signal processing modules of the transmitter and receiver described above.

In addition, memory 214 stores data/information 222 used and generated by logic 220.

In summary, in one aspect, an apparatus is provided comprising: a frequency accumulator to repetitively accumulate an input word to produce a frequency ramp; a symbol modulator to receive symbols and to add to the frequency ramp frequency offsets representative of the symbols, to produce a modulated frequency ramp for a modulated chirp; a spreading factor controller to control a roll-over rate of the modulated frequency ramp responsive to a spreading factor control signal and a frequency bandwidth control signal, to control a spreading factor and a frequency bandwidth of the modulated chirp; a center frequency controller to control a center frequency of the modulated frequency ramp and, correspondingly, the modulated chirp, responsive to a center frequency control signal; a phase accumulator to accumulate frequency samples of the modulated frequency ramp to produce phase samples corresponding to the modulated chirp; and a vector rotator to rotate the phase samples based on an input vector to produce the modulated chirp with the spreading factor, the frequency bandwidth, and the center frequency.

In another aspect, a method is provided comprising: repetitively accumulating an input word to produce a frequency ramp; receiving symbols and adding to the frequency ramp frequency offsets representative of the symbols, to produce a modulated frequency ramp for a modulated chirp; controlling a roll-over rate of the modulated frequency ramp responsive to a spreading factor control signal and a frequency bandwidth control signal, to control a spreading factor and a frequency bandwidth of the modulated chirp; controlling a center frequency of the modulated frequency ramp and, correspondingly, the modulated chirp, responsive to a center frequency control signal; accumulating frequency samples of the modulated frequency ramp to produce phase samples corresponding to the modulated chirp; and rotating the phase samples based on an input vector to produce the modulated chirp with the spreading factor, the frequency bandwidth, and the center frequency.

In yet another aspect, an apparatus is provided comprising: an input to receive a modulated chirp including a repeating frequency ramp that has frequency offsets representative of symbols added to the frequency ramp at symbol boundaries, the modulated chirp having a known spreading factor, a known center frequency, and a known bandwidth; a frequency accumulator to repetitively accumulate an input word to produce a frequency ramp; a spreading factor controller to control a roll-over rate of the frequency ramp responsive to a spreading factor control signal representative of the known spreading factor and a frequency bandwidth control signal representative of the known bandwidth; a center frequency controller to control a center frequency of the frequency ramp responsive to a center frequency control signal representative of a negative of the known center frequency; a phase accumulator to accumulate frequency samples of the frequency ramp with the controlled roll-over rate and the controlled center frequency, to produce phase samples; and a vector rotator to rotate the phase samples based on the modulated chirp, to produce a de-chirped signal including the symbols.

The above description is intended by way of example only. Various modifications and structural changes may be made therein without departing from the scope of the concepts described herein and within the scope and range of equivalents of the claims.

What is claimed is:

1. An apparatus comprising:
a frequency accumulator to repetitively accumulate an input word to produce a frequency ramp;
a symbol modulator to receive symbols and to add to the frequency ramp frequency offsets representative of the symbols, to produce a modulated frequency ramp for a modulated chirp;
a spreading factor controller to control a roll-over rate of the modulated frequency ramp responsive to a spreading factor control signal and a frequency bandwidth control signal, to control a spreading factor and a frequency bandwidth of the modulated chirp;
a center frequency controller to control a center frequency of the modulated frequency ramp and, correspondingly, the modulated chirp, responsive to a center frequency control signal;
a phase accumulator to accumulate frequency samples of the modulated frequency ramp to produce phase samples corresponding to the modulated chirp; and
a vector rotator to rotate the phase samples based on an input vector to produce the modulated chirp with the spreading factor, the frequency bandwidth, and the center frequency.

2. The apparatus of claim 1, wherein the symbol modulator, the spreading factor controller, and the center frequency controller are configured to produce the modulated frequency ramp, control the spreading factor and the frequency bandwidth, and control the center frequency, respectively, without performing any divide or multiply operations.

3. The apparatus of claim 1, wherein the symbol modulator includes:
a symbol bit shifter to bit-shift the symbols based on the frequency bandwidth to produce bit-shifted symbols that represent respective ones of the frequency offsets; and
an adder to add the bit-shifted symbols to the frequency ramp at symbol boundaries.

4. The apparatus of claim 1, wherein the spreading factor controller includes:
a mask to generate a mask word to control the roll-over rate of the modulated frequency ramp based on the spreading factor control signal and the frequency bandwidth control signal; and
an AND gate to bit-wise AND the mask word against frequency samples of the modulated frequency ramp.

5. The apparatus of claim 1, wherein:
the spreading factor controller is configured to output the modulated frequency ramp such that the modulated frequency ramp has a frequency spectrum that is not centered at zero Hertz; and
the center frequency controller is configured to:
center the frequency spectrum at zero Hertz; and
add to the frequency spectrum centered at zero Hertz a frequency offset represented by the center frequency control signal.

6. The apparatus of claim 1, wherein:
the spreading factor controller is configured to output the modulated frequency ramp such that the modulated frequency ramp includes frequency samples each represented as a respective frequency word having bits ranging from a least-significant-bit (LSB) to a most-significant-bit (MSB); and
the center frequency controller includes:
an inverter to invert only the MSB of each frequency word, to produce inverted frequency words; and
an adder to add the frequency control word to the inverted frequency words.

7. The apparatus of claim 1, wherein the vector rotator is configured to rotate the phase samples to produce the modulated chirp as a baseband chirp including complex samples, and wherein the apparatus further comprises a complex quadrature modulator to frequency upconvert the complex samples of the baseband chirp.

8. The apparatus of claim 1, wherein the vector rotator is configured to rotate the phase samples to produce the modulated chirp as a baseband chirp including complex samples each including an in-phase component and a quadrature component, wherein the apparatus further comprises a frequency upconverter to frequency upconvert the in-phase component, but not the quadrature component, of the complex samples.

9. The apparatus of claim 1, wherein the input vector has one of a scalar value or a complex value to cause the modulated chirp to have one of continuous phase at the symbol boundaries or additional bits encoded into both amplitude and phase information of the symbols, respectively.

10. The apparatus of claim 2, wherein the phase rotator includes a pipelined coordinate rotation digital computer (CORDIC) phase rotator to rotate the phase samples without performing any multiply or divide operations.

11. A method comprising:
repetitively accumulating an input word to produce a frequency ramp;
receiving symbols and adding to the frequency ramp frequency offsets representative of the symbols, to produce a modulated frequency ramp for a modulated chirp;
controlling a roll-over rate of the modulated frequency ramp responsive to a spreading factor control signal and a frequency bandwidth control signal, to control a spreading factor and a frequency bandwidth of the modulated chirp;
controlling a center frequency of the modulated frequency ramp and, correspondingly, the modulated chirp, responsive to a center frequency control signal;
accumulating frequency samples of the modulated frequency ramp to produce phase samples corresponding to the modulated chirp; and
rotating the phase samples based on an input vector to produce the modulated chirp with the spreading factor, the frequency bandwidth, and the center frequency.

12. The method of claim 1, further comprising performing the receiving, the adding, the controlling the roll-over rate, the controlling the center frequency, and the accumulating, without performing any divide or multiply operations.

13. The method of claim 1, further comprising:
bit-shifting the symbols based on the frequency bandwidth to produce bit-shifted symbols that represent respective ones of the frequency offsets,
wherein the adding includes adding the bit-shifted symbols to the frequency ramp at symbol boundaries.

14. The method of claim 1, wherein the controlling the roll-over rate includes:
generating a mask word to control the roll-over rate of the modulated frequency ramp based on the spreading factor control signal and the frequency bandwidth control signal; and
bit-wise ANDing the mask word against frequency samples of the modulated frequency ramp.

15. The method of claim 1, wherein:
the controlling the roll-over rate includes outputting the modulated frequency ramp such that the modulated frequency ramp has a frequency spectrum that is not centered at zero Hertz; and
the controlling the center frequency includes:
centering the frequency spectrum at zero Hertz; and
adding to the frequency spectrum centered at zero Hertz a frequency offset represented by the center frequency control signal.

16. The method of claim 1, wherein:
the controlling the roll-over rate includes outputting the modulated frequency ramp such that the modulated frequency ramp includes frequency samples each represented as a respective frequency word having bits ranging from a least-significant-bit (LSB) to a most-significant-bit (MSB); and the controlling the center frequency includes:
  inverting only the MSB of each frequency word, to produce inverted frequency words; and
  adding to add the frequency control word to the inverted frequency words.

17. The method of claim 2, wherein the rotating includes rotating using a pipelined coordinate rotation digital computer (CORDIC), without performing any multiply or divide operations.

18. An apparatus comprising:
  an input to receive a modulated chirp including a repeating frequency ramp that has frequency offsets representative of symbols added to the frequency ramp at symbol boundaries, the modulated chirp having a known spreading factor, a known center frequency, and a known bandwidth;
  a frequency accumulator to repetitively accumulate an input word to produce a frequency ramp;
  a spreading factor controller to control a roll-over rate of the frequency ramp responsive to a spreading factor control signal representative of the known spreading factor and a frequency bandwidth control signal representative of the known bandwidth;
  a center frequency controller to control a center frequency of the frequency ramp responsive to a center frequency control signal representative of a negative of the known center frequency;
  a phase accumulator to accumulate frequency samples of the frequency ramp with the controlled roll-over rate and the controlled center frequency, to produce phase samples; and
  a vector rotator to rotate the phase samples based on the modulated chirp, to produce a de-chirped signal including the symbols.

19. The apparatus of claim 18, further comprising:
  a directional inverter to control a direction of the frequency ramp responsive to a chirp direction control signal, such that the direction is one of an increasing frequency or a decreasing frequency that is opposite to a direction of the repeating frequency ramp.

20. The apparatus of claim 18, wherein the spreading factor controller, the center frequency controller, and the phase rotator perform respective operations without performing any divide or multiply operations.

* * * * *